US012571658B2

(12) United States Patent
Kurz et al.

(10) Patent No.: US 12,571,658 B2
(45) Date of Patent: Mar. 10, 2026

(54) INDUCTIVE POSITION SENSOR DEVICE, DRIVE DEVICE

(71) Applicant: Robert Bosch GmbH, Stuttgart (DE)

(72) Inventors: Andreas Kurz, Bietigheim (DE); Robert Alexander Dauth, Heilbronn (DE); Sina Fella, Neuenstadt (DE); Tim Krzyzanowski, Lauffen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 18/252,609

(22) PCT Filed: Oct. 29, 2021

(86) PCT No.: PCT/EP2021/080138

§ 371 (c)(1),
(2) Date: May 11, 2023

(87) PCT Pub. No.: WO2022/101032

PCT Pub. Date: May 19, 2022

(65) Prior Publication Data

US 2024/0019274 A1  Jan. 18, 2024

(30) Foreign Application Priority Data

Nov. 12, 2020  (DE) ..................... 10 2020 214 235.1

(51) Int. Cl.
*G01D 5/20* (2006.01)
(52) U.S. Cl.
CPC ........... *G01D 5/2053* (2013.01); *G01D 5/204* (2013.01)
(58) Field of Classification Search
CPC .......... G01D 5/20; G01D 5/202; G01D 5/204; G01D 5/2053; G01D 5/2225; G01D 5/2275
See application file for complete search history.

(56) References Cited

U.S. PATENT DOCUMENTS 6,011,389 A  *  1/2000  Masreliez ............ G01D 5/2053
                                                      324/207.17
6,313,624 B1 *  11/2001  Alhorn ................. G01D 11/245
                                                      336/84 R (Continued)

FOREIGN PATENT DOCUMENTS

CN       106796118 A       5/2017
CN       109073420 A      12/2018

(Continued)

OTHER PUBLICATIONS

International Search Report corresponding to PCT Application No. PCT/EP2021/080138, mailed Jan. 26, 2022 (German and English language document) (6 pages).

*Primary Examiner* — Steven L Yeninas
(74) *Attorney, Agent, or Firm* — Maginot, Moore & Beck LLP

(57) ABSTRACT

An inductive position sensor device for detecting the position of a coupling element which can be arranged on a movable actuator element of an electric machine is disclosed. The inductive position sensor device includes (i) at least one transmitter coil for generating electromagnetic waves, (ii) at least one receiver coil for detecting the electromagnetic waves which are generated by the transmitter coil and are influenced by the actuator element, and (iii) a computing unit which is designed to actuate the transmitter coil and evaluate the electromagnetic waves detected by the receiver coil in order to determine the position. The coils are arranged on a front face of a common printed circuit board, and the computing unit is arranged on a rear face of the common printed circuit board. The coils are electrically connected to the computing unit by connection lines which (Continued)

extend along the printed circuit board and through the printed circuit board. The connection lines run substantially parallel to one another.

11 Claims, 4 Drawing Sheets

(56)                References Cited

U.S. PATENT DOCUMENTS

| | | | |
|---|---|---|---|
| 2002/0011839 A1 | 1/2002 | Miyata et al. | |
| 2012/0266478 A1* | 10/2012 | Frank | G01D 5/2013 |
| | | | 228/115 |
| 2014/0132253 A1* | 5/2014 | Bertin | G01D 5/2053 |
| | | | 324/207.17 |
| 2016/0252368 A1* | 9/2016 | Troost | G01D 5/202 |
| | | | 324/207.15 |
| 2019/0301895 A1* | 10/2019 | Cook | G01B 3/205 |
| 2019/0360839 A1* | 11/2019 | Shao | H03K 17/97 |
| 2020/0064158 A1* | 2/2020 | Lee | G01D 11/30 |
| 2020/0200569 A1* | 6/2020 | Utermoehlen | G01D 5/204 |
| 2020/0232820 A1* | 7/2020 | Rosenegger | G01D 11/245 |
| 2020/0271480 A1 | 8/2020 | Shaga et al. | |
| 2021/0293581 A1* | 9/2021 | Cook | G01D 5/2053 |
| 2021/0396552 A1* | 12/2021 | Eder | G01D 5/20 |
| 2022/0057281 A1* | 2/2022 | Ausserlechner | G01L 5/0042 |
| 2022/0065610 A1* | 3/2022 | Heinemann | H05K 1/0298 |
| 2022/0065664 A1* | 3/2022 | Hristov | H01L 23/5227 |
| 2022/0178673 A1* | 6/2022 | Heinemann | G01D 5/20 |
| 2022/0231582 A1* | 7/2022 | Carvalho | H02K 11/225 |
| 2023/0145964 A1* | 5/2023 | Shao | G01D 5/20 |
| | | | 324/207.16 |

FOREIGN PATENT DOCUMENTS

| | | |
|---|---|---|
| DE | 197 19 905 A1 | 11/1997 |
| DE | 10 2015 220 615 A1 | 4/2017 |
| EP | 3 355 032 A1 | 8/2018 |
| EP | 3 683 551 A1 | 7/2020 |
| JP | 2001-210959 A | 8/2001 |
| JP | 2003-17817 A | 1/2003 |
| JP | 2005-183949 A | 7/2005 |
| JP | 2008-109094 A | 5/2008 |
| JP | 2013-64653 A | 4/2013 |
| JP | 2017-90431 A | 5/2017 |
| JP | 2020-115129 A | 7/2020 |
| WO | 2019/141861 A1 | 7/2019 |

* cited by examiner

INDUCTIVE POSITION SENSOR DEVICE, DRIVE DEVICE

This application is a 35 U.S.C. § 371 National Stage Application of PCT/EP2021/080138, filed on Oct. 29, 2021, which claims the benefit of priority to Serial No. DE 10 2020 214 235.1, filed on Nov. 12, 2020 in Germany, the disclosures of which are incorporated herein by reference in their entirety.

The disclosure relates to an inductive position sensor device for detecting the position of a coupling element which can be disposed on a movable actuator element of an electric machine, comprising at least one transmitter coil for generating electromagnetic waves and comprising at least one receiver coil for detecting the electromagnetic waves generated by the transmitter coil and influenced by the coupling element, and comprising a computing unit which is configured to actuate the transmitter coil and evaluate the electromagnetic waves detected by the receiver coil in order to determine the position of the actuator element, wherein the coils and the computing unit are disposed on a common printed circuit board and wherein the coils are disposed on a front side and the computing unit is disposed on a rear side of the common printed circuit board which faces away from the front side, and wherein the coils are electrically connected to the computing unit by connection lines which extend along the printed circuit board and through the printed circuit board.

The disclosure also relates to a drive device, in particular for a braking device of a motor vehicle, comprising an electric machine and comprising an inductive position sensor device associated with the electric machine for detecting a position of a movable actuator element, in particular a rotor or linear actuator, of the electric machine.

BACKGROUND

Inductive position sensor devices, in particular in the form of rotor position sensor devices that detect the rotor position or angular position of a rotor of an electric machine, are already known from the prior art. These devices utilize the effect that, depending on the angular position of the coupling element which is fastened to the rotor, in particular on the front side, and is exposed to a field of electromagnetic waves from a transmitter coil, said electromagnetic waves are influenced in a reproducible manner. To actuate the transmitter coil and evaluate the result detected by the receiver coil, such sensor devices routinely also comprise a control unit or a computing unit, for example in the form of a microprocessor or an application-specific integrated circuit (ASIC). The computing unit is in particular configured to actuate the transmitter coil to generate a modulated signal. The signal received by the receiver coil is then demodulated by the computing unit or optionally by a further computing unit to enable an evaluation of the signal and thus enable the signal to be influenced by the rotor of the electric machine. The electromagnetic waves thus couple from the transmitter coil into the coupling element and from the coupling element into the receiver coil, so that the electromagnetic signal detected by the receiver coil provides information about the angular position of the rotor.

The computing unit and the at least two coils, i.e. the transmitter coil and the receiver coil, are typically disposed on the same printed circuit board in order to implement a simple electrical and/or signal connection between the computing unit and the coils, and also to obtain a compact design.

SUMMARY

The position sensor device according to the disclosure having the features of claim 1 has the advantage that the printed circuit board is less expensive and more cost-efficient to produce than in the past, in particular because so-called shielding layers can be omitted. Up to now, said shielding layers have been used to interrupt or limit electromagnetic interference fields between individual planes of the printed circuit board. Due to the embodiment according to the disclosure of the position sensor device, however, such electromagnetic interference signals or fields are prevented from the very beginning or at least reduced to such an extent that additional shielding layers can be omitted. This in particular enables a reduction in the number of layers or planes of the printed circuit board. According to the disclosure, this is achieved by the fact that the connection lines which connect the computing unit to the coils extend at least substantially parallel to one another. The parallel implementation minimizes the induction in the region of the connection lines, which prevents an offset in the output signal and thus optimizes the measurement result. The connection lines are preferably also configured to be as short as possible.

According to a preferred embodiment of the disclosure, the connection lines extend at least partly parallel to one another on different planes of the printed circuit board. In this case, therefore, the connection lines are not on the same plane of the printed circuit board, but are spaced apart from one another by the planes of the printed circuit board. The implementation on different planes ensures an especially compact design of the printed circuit board and makes it possible for the connection lines to also be configured such that they are disposed directly above one another on the printed circuit board and can therefore be especially close to one another.

It is furthermore preferably provided that the connection lines extend parallel to one another on the different planes at least partly above one another. If the printed circuit board is circular or circular ring-shaped, as in a configuration as a rotor position sensor, the planes are positioned axially above one another and the connection lines which extend parallel to one another are positioned axially directly above one another. This achieves an especially compact design and an advantageous reduction of electromagnetic control effects.

According to an alternative embodiment of the disclosure, the or at least two of the connection lines extend substantially parallel to one another on one plane of the printed circuit board. The connection lines are thus not disposed above one another, but rather side by side on the printed circuit board or on a plane of the printed circuit board. This likewise advantageously reduces electromagnetic control effects, wherein the arrangement on one plane can be implemented cost-efficiently where appropriate.

It is furthermore preferably provided that the printed circuit board comprises a first, a second, a third and a fourth plane or layer disposed one above the other, wherein in each case at least one of the coils is at least partially disposed on the first plane and the second plane, the computing unit is disposed on the fourth plane and the portions of the connection lines which extend parallel to one another are disposed at least on the third and/or fourth plane. The printed circuit board is thus configured in four layers or with four planes, wherein the coils preferably lie on two planes and the computing unit and the connection lines or at least the portions of the connection lines which extend parallel to one another lie on the two remaining planes. This ensures an advantageous separation of the functions in the sensor device, which allows cost-efficient production of the printed circuit board with the elements disposed upon it. The routing or placement of the portions of the connection lines which extend parallel to one another in the third and/or fourth planes provides the advantage that the connection lines can be positioned independently of the extension of the coils, as a result of which the courses of the connection lines can be optimally implemented.

It is furthermore preferably provided that the position sensor device comprises at least one transmitter coil and at least two receiver coils, wherein the receiver coils are in particular disposed offset from one another on the printed circuit board. This results in a high and unambiguous resolution of the received signals or an unambiguous and in particular absolute determination of the position of the actuator element.

It is furthermore preferably provided that the respective receiver coil extends at least over the first and the second plane. The receiver coil thus extends over the two uppermost planes of the printed circuit board, thereby ensuring advantageous coil implementations in which portions of one and the same coil can in particular cross by being placed onto different planes.

It is furthermore preferably provided that the at least one transmitter coil extends only over the first plane or over at least the first and the second plane.

The printed circuit board is particularly preferably configured without a shielding layer; it therefore does not have an intermediate layer made in particular of copper, by means of which electromagnetic interference fields or signals are prevented from passing into the next plane. Due to the configuration of the position sensor device according to the disclosure, the provision of such a shielding layer is not necessary and is thus preferably avoided in this case. This in particular significantly reduces the manufacturing costs for the printed circuit board.

The printed circuit board is particularly preferably configured as a circular disk, in particular a circular ring disk, or as a strip, depending on whether the position sensor device is configured as a rotor position sensor device or a linear actuator position sensor device.

It is furthermore preferably provided that at least one EMC interference suppression capacitor, preferably a plurality of EMC interference suppression capacitors, are disposed on the rear side of the printed circuit board as well in order to improve the EMC compatibility of the position sensor device.

The drive device according to the disclosure has the features described below. This results in the aforementioned advantages.

BRIEF DESCRIPTION OF THE DRAWINGS

Further advantages and preferred features and combinations of features emerge in particular from the previously described and from the claims. The disclosure will be explained in more detail in the following with reference to the drawings. The figures show:

DETAILED DESCRIPTION

Figure 1:
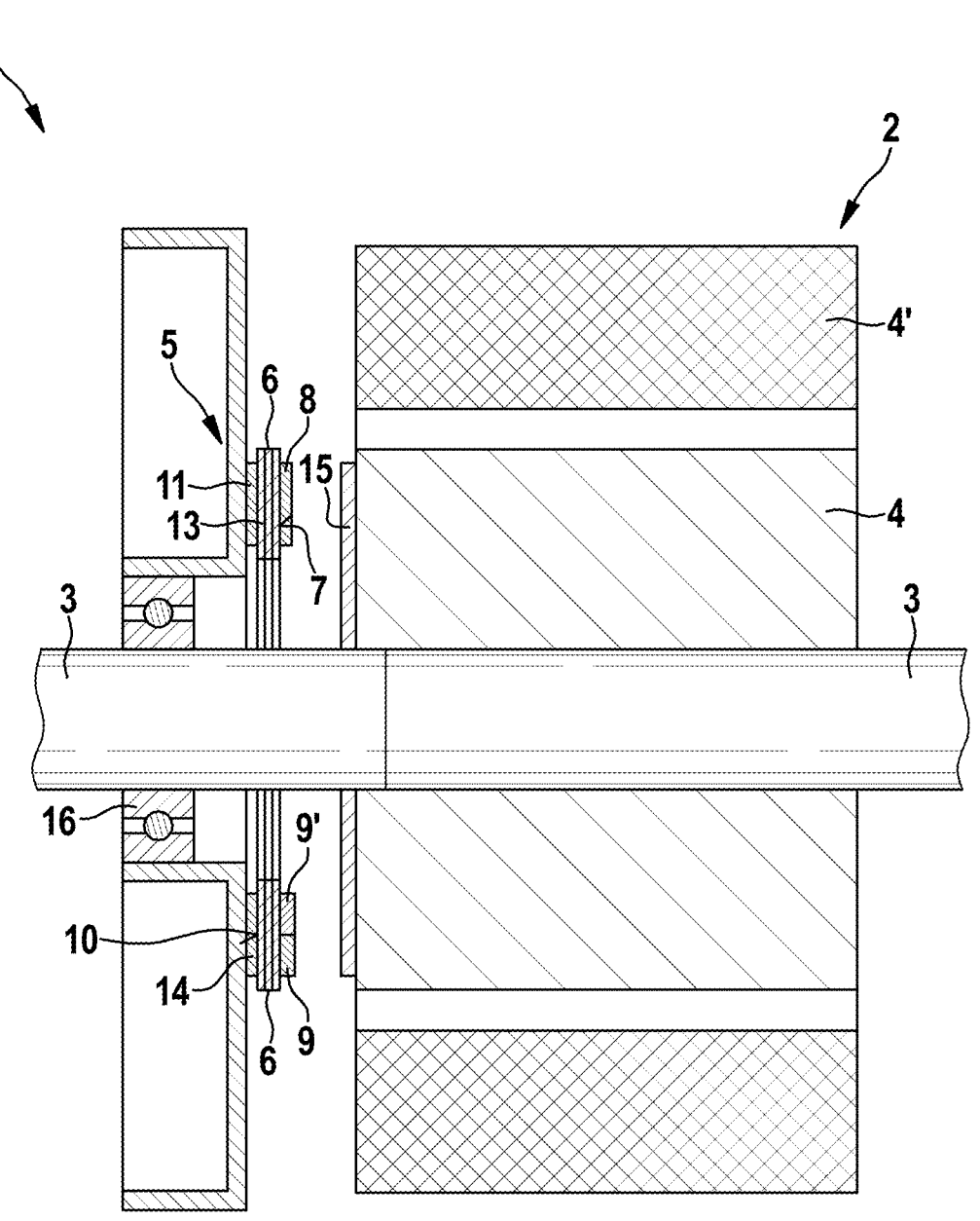
FIG. 1 an advantageous drive device in a simplified illustration.

FIG. 1 shows a simplified illustration of an advantageous drive device 1 for a consumer not shown in more detail here, for example a brake system, in particular a parking brake, of a motor vehicle. The drive device 1 comprises an electric machine 2, which comprises a drive shaft 3 that is rotatably mounted in a housing not shown here and carries a rotor 4 with which a stator 4' fixed to the housing is associated. The drive shaft 3 is or can be mechanically coupled to the consumer in order to drive it.

The rotor 4 of the electric machine 2 is assigned a position sensor device 5, configured here as a rotor position sensor device, which detects an angular position of the rotor of the rotor 4 by induction. For this purpose, the position sensor device 5 comprises a printed circuit board 6, which is circular ring disk-shaped according to the present embodiment example and is disposed coaxially with the drive shaft 3 of an end face of the rotor 4. On its front side 7 facing the rotor 4, the printed circuit board 6 carries at least one transmitter coil 8 and at least two receiver coils 9, 9'. On the rear side 10 of the printed circuit board 6 facing away from the rotor 4, a computing unit 11 is disposed, which according to the present embodiment example is configured as an application-specific integrated circuit (ASIC) and is electrically connected to the two coils 8, 9, 9'. The coils 8, 9, 9' are in particular printed on the printed circuit board 6, in particular on different planes of the printed circuit board 6, as will be explained in more detail in the following. For illustrative purposes, the coils 8, 9, 9' are shown greatly simplified as blocks in FIG. 1. Preferably, at least one EMC interference suppression capacitor 14 is disposed on the rear side 10 as well, and is in particular electrically connected to the computing unit 11 and/or the coils 8, 9, 9'.

The computing unit 11 is configured to actuate the transmitter coil 7 to emit a signal by means of electromagnetic waves, which penetrates a coupling element 15 of the position sensor device 5 disposed on the front side of the rotor 4 such that it faces the printed circuit board 6. The electromagnetic waves are influenced by the coupling element 15 and are reflected or directed to the receiver coil 9, wherein they are influenced as a function of the rotation angle position of the coupling element 15 or the rotor 4. The computing unit 11 is configured to demodulate the signal detected by the receiver coil 9 and influenced by the rotor 4 and to determine the angular position of the rotor 4 as a function of the detected signal. Methods for determining the angular position of the rotor by means of an inductive rotor position sensor device, commonly also referred to as an inductive rotor position sensor, are generally known, so that the specific function and implementation of the method will not be discussed here.

Figure 2:
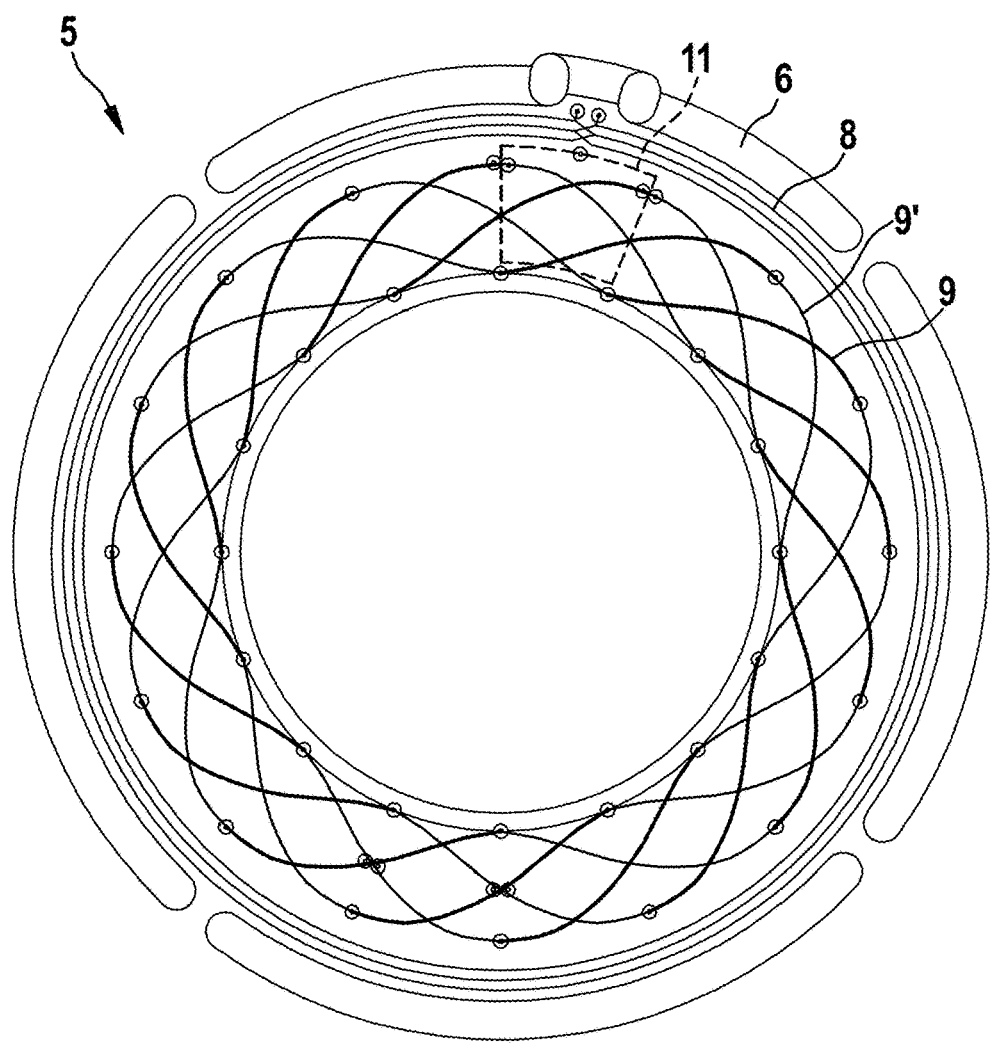
FIG. 2 an advantageous position sensor device of the drive device in a plan view, FIG. 3 a simplified illustration of the position sensor device in a side view, FIG. 4 an enlarged detail view of the position sensor device according to a first embodiment example, and FIG. 5 an enlarged detail view of the position sensor device according to a second embodiment example.

FIG. 2 shows the position sensor device 5 in a simplified plan view. As already mentioned, the printed circuit board 6 is circular ring-shaped. The coils 8, 9 are disposed above one another in different planes of the printed circuit board 6, so that they cross at multiple locations in plan view shown in FIG. 2. The computing unit 11 is positioned behind the coils 8, 9, so that the coils 8, 9 lie above the computing unit 11 in plan view. The computing unit 11 and coils 8, 9 are thus not only disposed on different sides of the printed circuit board 6, but are also disposed such that they are directly above one another, which ensures an especially compact design with short connection distances to the computing unit 11.

Figure 3:
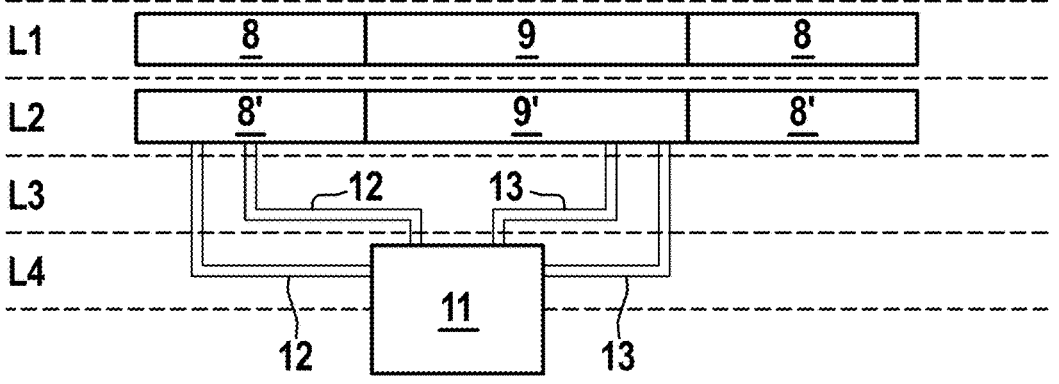

According to the present embodiment example, the printed circuit board is configured in four layers and thus comprises four planes. This is illustrated in FIG. 3 in a simplified side view. Parts of the transmitter coil 8 and the receiver coils 9, 9', the courses of which also overlap, for example, are disposed in a first plane L1.

A respective further part of the transmitter coil 8 and the receiver coils 9, 9' is configured in the underlying second plane L2. There is in particular only one transmitter coil 8 and two receiver coils 9, 9', each of which extends over the planes L1 and L2.

The computing unit 11 is disposed in the lowest plane L4 on the rear side 10 of the printed circuit board 6, as already mentioned. Connection lines 12 of the transmitter coil 8 and connection lines 13 of the receiver coils 9, 9', by means of which the transmitter coils 8, 8' and 9, 9' are electrically connected to the computing unit 11, are configured in the third plane L3 located between the plane L4 and the plane L2 and also in plane L4. Needless to say, the connection lines 12, 13 extend through all of the planes necessary to reach the respective coil 8, 8', 9, 9'. In planes L3 and L4, however, the connection lines 12, 13 extend at least substantially parallel to one another, as shown in a simplified manner in FIG. 3.

Figure 4:

FIG. 4 shows a simplified detail plan view onto the printed circuit board 6, wherein the connection lines 12, 13 in the planes L3, L4, which extend radially, or not axially, parallel to one another such that they lie directly above one another. The connection lines 12, 13 between the computing unit 11 and the coils 8, 9 extend parallel on the third and fourth layer L3, L4 or parallel on the same layer L3, L4 for as long as possible. The induction effect in the connection region is thus minimal, so that the offset in the signal is minimized as well. At least it is so negligible that there are no incorrect measurements or the output signal is as linear as possible. The connection lines 12, 13 between the computing unit 11 and the coils 8, 9 are preferably moreover configured to be as short as possible in order to also minimize interference fields or signals caused by induction.

Whereas the computing unit in present-day sensor devices is typically not disposed on the rear side of a printed circuit board because the induction in the region of the coil connections leads to a large offset and thus to a high linearity deviation, the advantageous embodiment of the sensor device 5 according to the present embodiment example is well-suited for making this possible even in a four-layered printed circuit board, and without having to use additional shielding layers between the individual planes. Sine and cosine type output signals are obtained from the demodulated signal of the receiver coil 9, 9'. The ATAN is formed in order to obtain a linear signal depending on the path or angle. The more similar the signals to cosine and sine, the lower the high harmonic signal components are and the more linear the output signal is. The linearity can be quantified: If a perfect ATAN of sine and cosine (a straight line) is derived from the ATAN (signal 1, signal 2), the linearity deviation, i.e. the deviation from ideal sine and cosine signals, is obtained. Since typically only a finite number of support points of the path-signal curve can be stored, a high non-linearity indicates either low accuracy or increased calibration effort. In electric machines with poorer controls, this can lead to vibrations and noises. To reduce the errors, shielding layers, for example made of copper, have hitherto been placed between the planes to reduce the influence of the interference fields. Due to the advantageous configuration of the present position sensor device 5, such layers can be omitted for the abovementioned reasons, as a result of which the design of the printed circuit board 6 is overall cost-efficient and even more space-saving.

Figure 5:
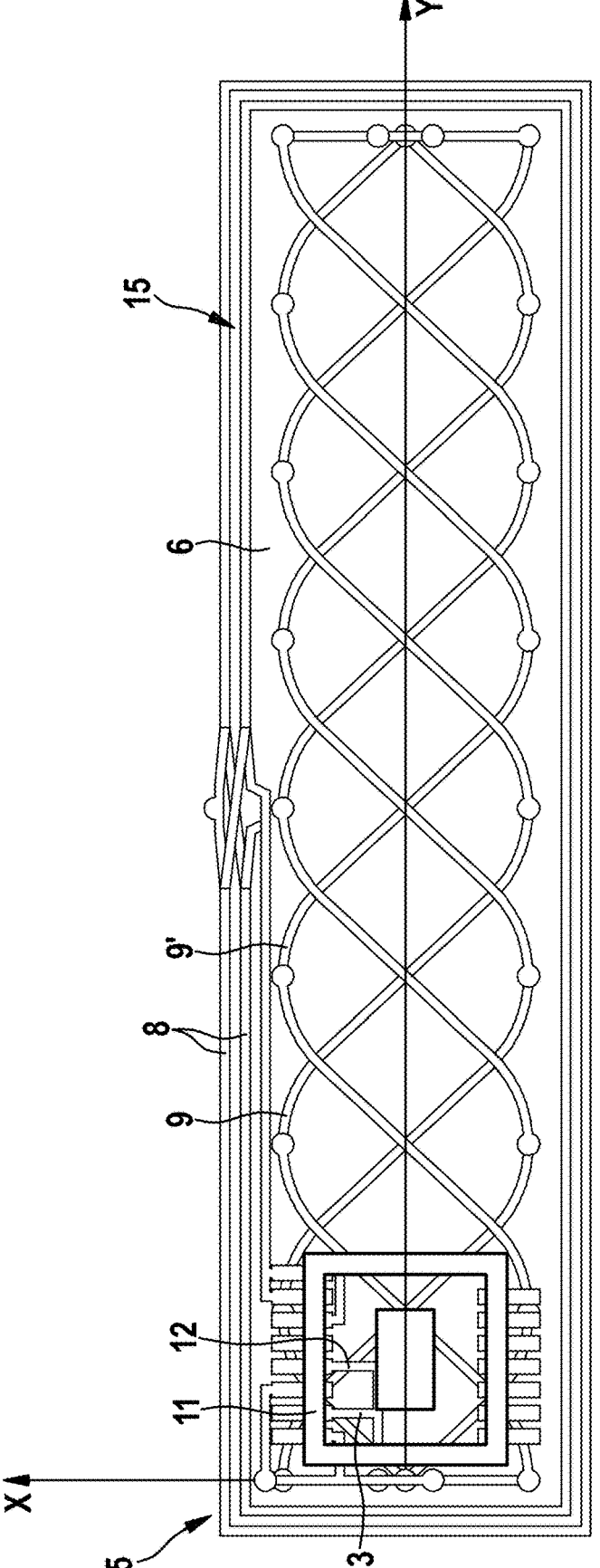

Whereas, according to the present embodiment example, the actuator element to be tested is a rotor 4, according to a further embodiment example the actuator element is a linear actuator element 15 as shown in FIG. 5. This differs from the preceding embodiment example in that the printed circuit board 6 is not circular ring-shaped but is instead strip-shaped, wherein the coils 8, 9, 8', 9' extend in the longitudinal extension of the strip-shaped printed circuit board 6. Aside from that, the computing unit 11 is likewise disposed in the plane L4 and the coils are disposed in the planes L1, L2. Here, too, the connection lines of the coils to the computing unit 11 are configured at least substantially parallel to one another in different planes, in particular such that they are disposed directly above one another.

As an alternative to an implementation of the connection lines 12, 13 above one another in different layers, it is also conceivable to allow the connection lines 12, 13 or at least one of the connection lines 12, 13 to extend parallel to one another in one plane L1-L4 or layer. This likewise makes it possible to reduce the interference signals as a result of the parallel implementation.

The invention claimed is:

1. An inductive position sensor device for detecting the position of a coupling element which can be disposed on a movable actuator element of an electric machine, comprising:

at least one transmitter coil configured to generate electromagnetic waves;

at least one receiver coil configured to detect the electromagnetic waves generated by the transmitter coil and influenced by the actuator element; and a computing unit configured to actuate the transmitter coil and evaluate the electromagnetic waves detected by the receiver coil in order to determine the position, wherein:

the coils are disposed on a front side and the computing unit is disposed on a rear side of a common printed circuit board, the coils are electrically connected to the computing unit by connection lines which extend along the printed circuit board and through the printed circuit board, the connection lines include portions that extend substantially parallel to one another and that are disposed directly one above the other on the printed circuit board, the printed circuit board comprises a first layer, a second layer, a third layer, and a fourth layer disposed one above the other, in each case at least one of the coils is at least partially disposed in the first layer and the second layer, the computing unit is disposed in the fourth layer, and the portions of the connection lines which extend parallel to one another and directly one above the other lie in the third and fourth layers.

2. The inductive position sensor device according to claim 1, wherein further portions of the connection lines extend at least substantially parallel to one another on one plane of the printed circuit board.

3. The inductive position sensor device according to claim 1, further comprising a transmitter coil and at least two receiver coils, wherein the receiver coils are disposed angularly or linearly offset to one another on the printed circuit board.

4. The inductive position sensor device according to claim 3, wherein a first one of the at least two receiver coils extends over the first layer and a second one of the at least two receiver coils extends over the second layer.

5. The inductive position sensor device according to claim 1, wherein the at least one transmitter coil extends only over the first layer or over at least the first and second layers.

6. The inductive position sensor device according to claim 1, wherein the printed circuit board is configured without a shielding layer between any of the first, second, third, or fourth layers.

7. The inductive position sensor device according to claim 1, wherein the printed circuit board is configured as a circular disk or as a strip.

8. The inductive position sensor device according to claim 7, wherein the printed circuit board is configured as a circular ring disk.

9. The inductive position sensor device according to claim 1, wherein at least one EMC interference suppression capacitor is disposed on the rear side.

10. A drive device for a parking brake of a motor vehicle, comprising:

an electric machine with an inductive position sensor device associated with the electric machine for detecting a position of a movable actuator element of the electric machine, wherein the position sensor device is configured according to claim 1.

11. The drive device according to claim 10, wherein the movable actuator element of the electric machine includes a rotor or a linear actuator.

\* \* \* \* \*